United States Patent [19]
Green

[11] 3,879,996
[45] Apr. 29, 1975

[54] METER TRANSLATION DEVICES FOR TORQUE MEASURING WRENCHES AND THE LIKE

[75] Inventor: Talmage O. Green, Schaumburg, Ill.

[73] Assignee: Snap-on Tools Corporation, Kenosha, Wis.

[22] Filed: Oct. 4, 1973

[21] Appl. No.: 403,603

[52] U.S. Cl. ............................... 73/139; 73/432 A
[51] Int. Cl. ............................................. G01l 5/24
[58] Field of Search ....... 73/139, 432 A; 116/129 R; 33/172 B; 74/89.2, 89.22

[56] References Cited
UNITED STATES PATENTS

| | | | |
|---|---|---|---|
| 1,522,986 | 1/1925 | Taylor | 116/129 R |
| 1,594,536 | 8/1926 | Ludlow | 116/129 R X |
| 2,636,394 | 4/1953 | Melchior | 74/89.2 |
| 2,948,887 | 8/1960 | Mounteer et al. | 74/89.2 UX |
| 3,000,209 | 9/1961 | Gill | 73/139 |

FOREIGN PATENTS OR APPLICATIONS

| | | | |
|---|---|---|---|
| 818,276 | 8/1959 | United Kingdom | 73/139 |

Primary Examiner—Charles A. Ruehl
Attorney, Agent, or Firm—Harry C. Alberts

[57] ABSTRACT

The invention involves a meter translation instrumentalities that effectively and commensurately translates movement between an actuator and a calibrated measuring dial or the like spaced therefrom, and readily affords adjustment for simple, accurate calibration corrections to insure precise measurements commensurate with the applied load irrespective of wear or frictional variations that may develop owing to deflections in the prescribed manual application of the twisting or flecing force occurring in the use thereof. In the present embodiment this is accomplished with a thin wire tensioning sling on the twist or flex translating arm utilized in torque wrenches and the like wherein the dial pointer actuator constitutes a tensioned wire instrumentality instead of meter gear elements for pointer displacement. This constitutes an improved, more simple and less expensive measurement translation element which minimizes the number of parts and dispenses with gear train elements that are more expensive to produce and require greater accuracy in their manufacture.

10 Claims, 8 Drawing Figures

PATENTED APR 29 1975   3,879,996

METER TRANSLATION DEVICES FOR TORQUE MEASURING WRENCHES AND THE LIKE

This invention relates to improved measuring and translation devices of the type embodied in torque measuring wrenches of both the flex beam and torsion type disclosed in U.S. Pat. Nos. 2,312,104; 2,314,623; 2,715,333; 3,633,418 and 3,763,724, although this feature may be employed with equal advantage in other measuring applications and instruments.

It contemplates more especially the provision of an improved, more dependable, and less expensive translation instrumentality in the form of a thin wire tension sling which maintains a uniform tension of the wire convoluted around a dial pointer mounting stub shaft as a substitute for the train of gear elements usually in pointer measuring meters and the like regardless of its multiplanar directional application and use. The term "multiplanar" denotes that the dial mechanism accurately and effectively operates in infinite planar directions, since all hand tools such as torque wrenches, may be applied to fasteners for turning in a clockwise or counterclockwise direction in an infinite variety of planes which may be horizontal, vertical or at any and all angles therebetween. It is important, therefore, that the calibrated dial or other measuring mechanism operate accurately in multiplanar directions and positions without being affected by gravity.

As applied to torque wrenches measuring the flex in a beam or the twist in a work engaging shank which resist the turning force applied to the load in measuring the amount of torque or force applied in nut turning and similar operations, a flat substantially featherweight spring tensioning sling mount is operatively interposed between the translation member and calibrated meter to which the wire is convoluted for rendering the latter responsive to the former. The amount of torque is measured by determining the degree of twist in a shank or flex in a beam that is translated to the measuring meter through the medium of a thin convoluted tensioning sling serving as a mount on a load translation member. Such measuring wrenches are substantially free from internal stresses and friction in the moving parts and is adjustable to compensate for temperature, material fatigue, wear, and climatic variations to accurately designate the force applied in nut turning and similar movements over extended periods of time without entailing the time, inconvenience and expense of factory service for that purpose. The twist or flex in torque wrenches are translated commensurately to a measuring meter, and with the teachings of the present invention, the movement translation is effected with the use of a wire tensioning mount or sling convolutely interposed between the translation element and the calibrated dial pointer to obviate the usual train of meter gear elements that require extreme accuracy in their production and involve more expensive parts.

The desirability of utilizing a tensioning wire mount in conjunction with a yieldable straight-line translating member as the measuring expedient, has been accomplished with utmost advantage. In order to insure more accuracy in use over extended periods, the degree of twist or flex in a beam or any other load measuring element should be translated to an indicator at a point of maximum displacement so that accurate measurements can be recorded by compensating for temperature, fatigue, and climatic conditions and, further reducing the error factor to a minimum and providing improved translation instrumentalities. In the present embodiment, the translating member is equipped with a pointer convoluted tensioned wire which is wound around the pointer pin or stub shaft actuator instead of utilizing a meter gear train to simplify the translation and convert measurable load actuations into rotary commensurate calibrated dial measurements. This is accomplished by providing an improved mount preferably though not essentially detachably and adjustably associated with the turning load translation member to operably connect with the calibrated dial in the measurable plane of translation responsive to applied force for tightening and loosening fasteners and the like in its specific application to torque wrenches; however, many other advantages and applications are possible within the dictates of commercial practice.

The importance of accuracy in all measurement movements cannot be over-emphasized, and the degree of accuracy depends largely upon the elimination of or substantial reduction in or the automatic compensation for wear, friction, temperature variations and utilizing minimal moving parts. This is also important in torque wrenches that embody measuring instrumentalities actuated by flexing a torque resisting beam to provide the desired reading; however, wrenches embodying teachings of the present invention particularly with improved translating and movement converting instrumentalities embodied herein.

One object of the present invention is to simplify the construction and improved the operation of translation and meter instrumentalities for torque measuring wrenches and the like.

Another object is to provide more simple, compact, featherweight, and inexpensive translation expedients involving an improved mount serving as an operable connector between the measuring actuator and the calibrated measuring instrumentality responsive thereto in all positions for inclusion in a torque wrench or the like which is multiplanar in application and use, and substantially uninfluenced by the urge of gravity.

Still another object is to provide a torque measuring turning tool having improved and less expensive load translating means involving a substantially featherweight tensile connector interposed between the work engaging elements and the calibrated meter pointer for accurate measuring thereof responsive to the torque applied in multiplanar directions of use in normal turning operations and the like.

A further object is to provide measuring actuators with responsive measuring instrumentalities through improved translation expedients including an improved substantially featherweight multiplanar operative mount to tension an extremely flexible wire connectors therebetween in tensioned frictional engagement therewith to render the former responsive to the latter.

A still further object is to provide an elongated translation member with a substantially featherweight wire tensioning mount having pointer frictional connection therewith through a highly flexible wire therebetween operable in multiplanar positions and directions.

Still a further object is to provide a novel, simple, and effecive flat spring stationary sling-type mount on a load translation member with a highly flexible thin wire uniformly tensioned thereon for frictional convoluted connection with measuring instrumentalities for rendering such responsive to the displacement of the translation member.

Other objects and advantages will appear from the following description of an illustrative embodiment of the present invention.

Figure 1:
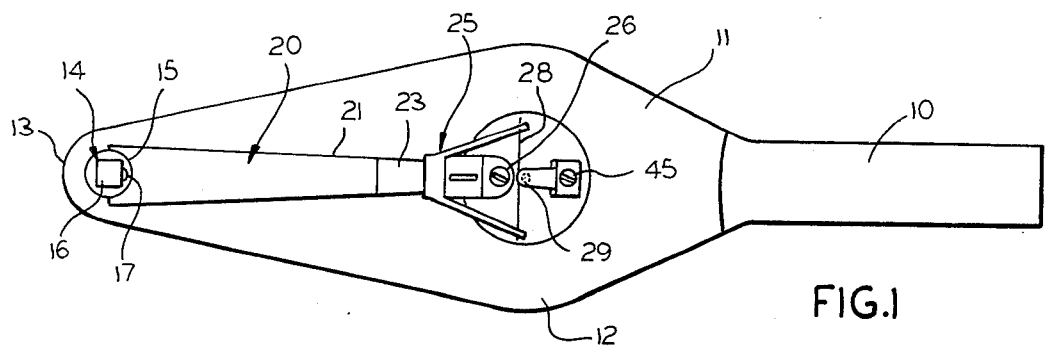
FIG. 1 is a bottom plan view of a torsion measuring wrench embodying the wire mount feature of the present invention, the casing cover plate being removed to illustrate the inner instrumentalities thereof.

The structure selected for illustration comprises a suitable handle member 10 of standard construction that terminates in an elongated rigid steel plate 11, in this instance stamped or otherwise shaped from steel or the like for sustaining the measured turning load within the capacities for which they are designed. The plate 11 is more or less diamond-shaped, in this instance for greatest width in the meter region as at 12 to protect the latter against edge impacts as will appear more fully hereinafter. The handle 10 with its elongated plate 11 and a confronting housing (not shown) provides a complemental chambered body or cover that is detachably mounted to the plate 11 in any suitable and well known manner to protect the working parts mounted on the plate 11 for measured nut turning. In fact, the housing does not sustain any turning load and primarily serves to confine the measuring instrumentalities as a protection against foreign substances and impacts.

The handle plate 11 is sufficiently rigid to avoid a flex, distortion or consequential variation under turning load. Its semi-circular head 13 is provided proximate thereto with a recess corresponding substantially in curvature therewith and sized to receive a load turning member 14 that is anchored by welded attachment therein and to the handle plate 11. The revoluble turning member 14 has an annular shoulder 15 formed, in this instance, integral therewith immediately and proximate to a polygonal wrench socket receiving extremity 16 which terminates exteriorly of a casing or housing (not shown) detachably associated with the plate 11 beyond the handle end 10 thereof. A spring impelled detent 17 of standard construction is provided in a face of the polygonal shank 16 for cooperation with a correspondingly sized and shaped recess provided in wrench sockets or other turning implements that is frictional telescoped thereon for retention thereon by the spring impelled detent 17 against accidental detachment.

Wrench sockets or other turning implements (not shown) would normally be provided with a recessed shank shaped and sized to conform with the polygonal extremity 16 of the revoluble turning member 14 so that the friction exerted by the spring impelled detent 17 would be effective in retaining the turning implement thereon against accidental removal. As shown, the revoluble member 14 has a cylindrical extension 18 constituting a turning shank which, in this instance, is formed integral with the annual shoulder 15 and polygonal shank 16 in axial relation therewith. The cylindrical turning shank 18 terminates for contact at its base extremity 19 with the interior head portion surface of the steel plate 11 for welded joinder therewith around the circumference of the base extremity 19 of the turning shank 18. This rigidly anchors and attaches the work engaging turning shank 18 to the handle plate 11 so that they operate as a single fixed member. The head portion of the handle plate 11 has a semi-circular extremity 13 that conforms in size and shape with the semi-circular extremity of the casing (not shown) but illustrated and described in the above referred to prior art letters patents.

With this arrangement, the turning member 14 projects through the chamber of the casing body (not shown) so that the polygonal extremity 16 will be exteriorly accessible beyond the casing bottom for engagement and disengagement with turning members such as wrench sockets and the like. It should be noted that the revoluble turning member 14 is rigidly attached to the handle plate 11 that is preferably of rigid and nonyielding material such as steel while the body or housing may be cast or otherwise shaped from aluminum in that the revoluble turning member 14 is mounted for twist movement relative thereto in sustaining the turning load. The casing, on the other hand, does not directly carry any appreciable load and serves only as a protective cover for the operating instrumentalities to be hereinafter described. Turning movement is imparted to a fastener such as a threaded nut through a wrench socket attached to the polygonal shank 16 of the revoluble turning member 14 responsive to manually applying force or effort to the handle 10 in one direction or another.

In order to measure the extent to which any fastener such as a threaded nut is applied through the manipulation of the handle 10, the extent of twist sustained by the cylindrical extension 18 of the revoluble turning member 14 is determined in that this will be uniform for any predetermined applied turning force and will vary proportionately to the turning load imparted through the handle 10 that is primarily sustained by the rigid handle plate 11. It will be observed that any turning movement applied to the handle 10 will be transferred to the elongated plate 11 which, in turn, will rotarily displace the revoluble work engaging turning member 14 which carries a wrench socket receiving nut or other turning implement to the end that proportional twist is imparted to the cylindrical extension 18 anchored to the handle plate 11 along the circumferential base 19 and free to twist at the other extremity 16 responsive to carrying the turning load.

Figure 3:
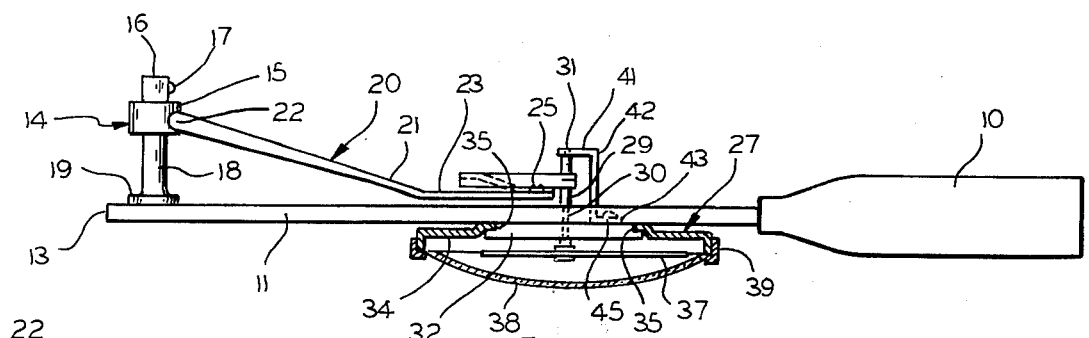
FIG. 3 is a side edge view in elevation of the torsion type wrench shown in FIG. 1 with the dial and measuring wrench shown in section to reveal the pointer and its stub-shaft mount for connection with a fine wire convoluted therearound (FIG. 6) and operatively connected to the tensioning mount therefor.
Figure 5:
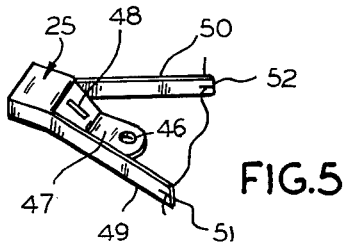
FIG. 5 is an enlarged perspective view of a substantially featherweight wire tensioning mount carried by the translation arm illustrated in FIG. 4.

In order to measure the degree of twist or torsion imparted to the cylindrical extension 18 of the revoluble member 14 responsive to any turning operation, an elongated measuring instrument actuator 20 better termed a twist translating arm projects radially from the turning shank shoulder 15. The twist translating shank arm 20 comprises, in this instance, a tapered plate member 21 having a recessed end 22 transversely arcuate for fitting contact with the shank annular shoulder 15 for welded joinder therewith. The shank arm 20 inclined upwardly proximate to the vertical offset 22 to provide a substantially horizontally disposed end region 23, and the shank arm 20–21 constitutes an integral translation member with its extension 23 provided with an end aperture 24 to receive a mount which preferably though not essentially comprises a threaded screw 26 for attachment of the wire tensioning sling bracket 25 (FIG. 5) that is rotatively adjustable as will appear more fully hereinafter (FIGS. 1 and 3). It should be noted that the sling 25 is of substantially featherweight construction that is stationary relative to the transmission member shank arm 20 to which it is adjustably mounted as at 24 by means of the threaded fastener 46. The sling 25 with its tensioned wire 28 convoluted around the pointer stub shaft 29 is capable of operable use in any multiplanar position or direction with the actuation of the hand tool handle 10 or in any other application depending upon the dictates of commercial practice.

The threaded set screw 26 not only attaches the sling 25 to the translation member 20–21–23 for stationary mounting relative thereto and movement therewith, but also serves to rotarily position and adjust the sling 25 to afford rotary adjustment thereof for changing the throw of the pointer 37 per unit of load sustained by the work engaging turning member 14. This is possible because the throw varies depending upon the angular position of the sling 25 relative to its translation member 20–21–23. The set screw 26 retains the wire tensioning sling bracket 25 in any preset rotary position relative to the translation member 20–21–23 for correcting the adjustment of the calibrated dial meter mechanism 27 that is operatively responsive to a very thin and flexible wire 28 convoluted around a pinion stub-shaft 29 comprising part of the calibrated dial meter mechanism 27 to be presently described.

The stub-shaft pinion 29 has reduced ends 30–31 for journalled vertical and horizontal support in a circular meter base plate 32 (FIG. 8) which has a stepped peripheral shoulder 33 to serve as a complement of an enlarged circular dial casing plate 34 (FIG. 3) which has an inner open center hole 35. The center hole 35 of the dial plate 34 is reversely stepped and sized to interfit with the stepped periphery 33 of the meter base plate 32 for pressed connection and attachment therebetween. The reduced end 30 of the pinion stub-shaft 29, is journalled axially through axis of the meter base plate 32 to operatively rotate the dial pointer 37 which is supported by the reduced extremity 30 of the pinion shaft 29. A dial crystal 38 is held in position on the meter mechanism casing plate 34 by a crystal rim 39 to enclose the inner face of the dial plate 34 which is calibrated for reading relative to the rotatable pointer 37.

Figure 7:
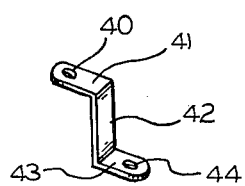
FIG. 7 is an enlarged perspective view of the pointer stub-shaft mounting bracket that is attached to the meter plate shown assembled in FIGS. 3 and 8.
Figure 8:
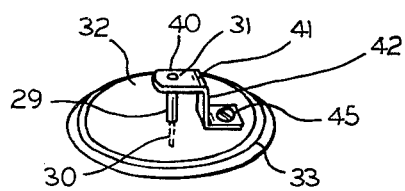
FIG. 8 is an enlarged perspective view of the pointer mounting plate showing the stub-shaft and end mountings therefor.

The other reduced pinion stub-shaft end 31 is journalled in an aperture 40 of a bracket arm 41 (FIG. 7) that is offset by an arm 42 to provide a bracket attaching arm 43 disposed oppositely to the arm 41 in an offset plane. An aperture 44 in the arm 43 provides for attachment thereof to the circular base plate 32 of the dial mechanism by means of a threaded stud 45 (FIG. 8). With this arrangement, the pinion stub-shaft 29 is journalled at both ends and rotatively supports the pointer 37 in confronting relation to the calibrated annular inward surface 34 of the dial mechanism 27.

Figure 4:
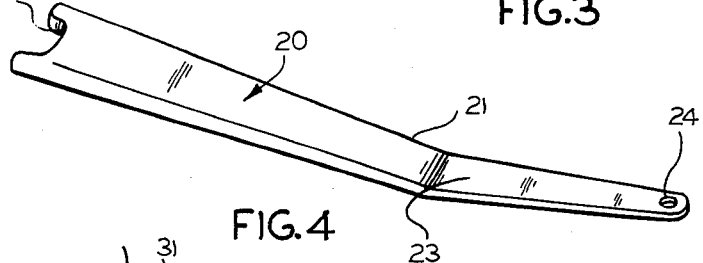
FIG. 4 is a perspective view of the torsion shank translating arm extension normally disposed between the shank arm and measuring instrumentalities.
Figure 6:
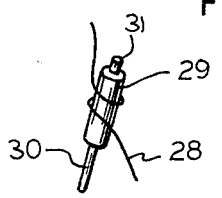
FIG. 6 is an enlarged perspective view of the pointer stub-shaft with the fine wire convoluted therearound prior to being tensioned by the wire sling-type mount illustrated in FIG. 5.

Now, then, to convert the torsional twisst of the shank 18 to rotary proportional movement of the pointer 37 in any planar direction or position of the translation member 20 during use of the handle 10 to operate the work engaging member 16, in this instance, for turning fasteners to a predetermined torqueing load. A wire tensioning sling bracket 25 (FIG. 5) is carried by the horizontal translation member extension 23 proximate to its free end. The latter is provided with an aperture 24 aligned with an aperture 46 provided in a tongue 47 extending from an inclined bracket arm 48 that is an integral part of the cubic-shaped wire tensioning sling body 49 of the sling 25. The wire tensioning sling body 25 has two elongated outwardly spring arms 49–50 stamped or otherwise shaped from the sides of the cubic body to present integral confronting and normally divergent spring-urged wire tensioning retainers. The sling 25 tensions the wire 28 that is convoluted around the pointer stub shaft 29 (FIG. 6) to commensurately turn the pointer 37 relative to the calibrated dial plate 34 (FIG. 3), and its featherweight construction is unaffected by the urge of gravity so that it accurately measures the torque load in multiple planar directions as required in many mechanical devices. The divergently sprung arms 49–50 normally tend to spread outwardly, and each has a slit 51–52 provided in the free ends thereof to receive the thin wire 28 therein after being convoluted at least once around the meter pinion stub-shaft 29 (FIG. 4). It should be observed that with the substantially featherweight sling 252 and its outwardly sprung fixed arms 49–50, the thin wire 28 is held at a constant tension convoluted around the pointer stub shaft 29 so that the pointer 37 will accurately respond to the turning load imposed by the user in manually applying turning force to the handle 10 in any or all multiplanar directions depending upon the application of the work engaging head 16 to fasteners or the like on machines or other devices.

The ends of the wire 28 are frictionally displaced into the confronting arm slits 51–52, then wrapped around the arm ends a number of times, and the free terminal ends thereof then reinserted into the slits 51–52 to hold the pinion shaft convoluted wire 28 tensioned slightly by the outwardly sprung normal urge of the confronting arms 49–50. This maintains the convoluted wire 28 in friction contact with the pinion stub-shaft 29 so that movement of the torsion translating arm 20–21–23 with the wire tensioning sling 25 responsive to the turning load on the revoluble turning shank 18. This twist in the turning shank 18 will rotate the pointer supporting pinion shaft 29 relative to the calibrated meter annulus 34 (FIG. 3) to provide a moment arm turning load meter reading commensurate with the actual torque load expressed in any of the measurement systems for which the meter annulus 34 was calibrated.

The meter pinion shaft convoluted wire expedient 28 eliminates resort to the more expensive train of meter gear and gear sector elements usually required in such translations of movements from the actuator, in this instance the turning load manually applied to the handle 10, to the meter read-out which, in this instance, is the pointer 37 facing the calibrated meter annulus 34 otherwise termed as the dial casing plate 34 herein. It should be noted that the tensioned convoluted wire 28 can be utilized on any type of torque wrench such as the torsion type thus far described, the flex beam type of which there are different specie, and in measuring devices of many other type not necessarily involving torque wrenches so long as there is a moving force or load to be measured and a measuring meter that is receptive thereto with the translation mechanism interposed therebetween and provided with a very small diameter wire (0.002 inch as an example of an alloy steel wire) convoluted and held slightly and uniformly tensioned with a substantially featherweight sling mount 25 carried and adjustably attached by the screw 26 to the translation member 20 which responds to the actuating force or load or movement to be measured.

Figure 2:
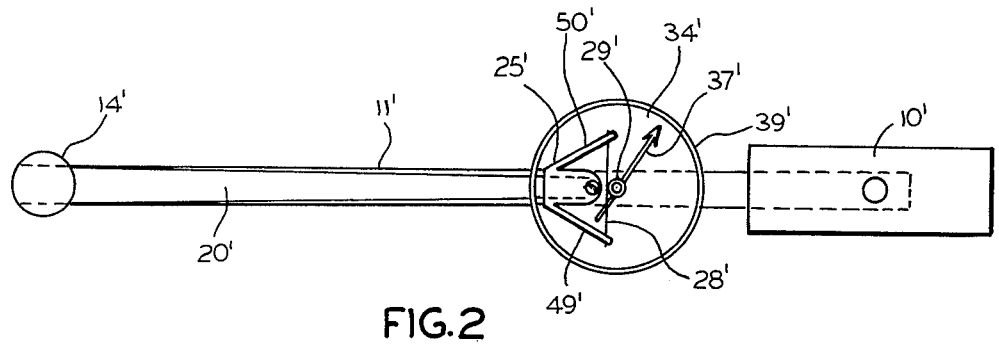
FIG. 2 is a view similar to FIG. 1 of a flex beam type measuring wrench embodying the pointer operating tensioned wire sling-type mount load translating member embodying features of the present invention.

As an example, the adaptation of the convoluted meter wire principle to a flex beam type of torque wrench, is illustrated and described in connection with FIG. 2 of the drawing herein. Like numbers are primed to represent corresponding parts already described in connection with the primary embodiment. This specie of flex beam type of torque wrench embodies a handle 10' attached to a beam 11' that carries a work engaging head 14' to which an elongated meter translating member 20' is attached to carry a wire tensioning sling 25' relative to a meter 29'–34'–39'. A small diameter flexible wire 28' is convoluted around the meter pinion stub-shaft 29' and tensioned lightly by the confronting arms 49'–50' of the sling mount 25'. This relative translation between the flex beam 11' and stationary member 20', will operate the pointer 37' relative to the calibrated dial 34' to measure the torque turning load applied by the manual force imparted to the handle 10'. Still other types of torque wrench applications are possible with the teachings of the present invention. Further, the tensioning convoluted wire sling device may take different forms depending upon its specific applications to other movements and load translations apart from torque wrench applications, and it should be understood that the wire diameter may vary within a wide range depending upon the load factor, the pinion diameter, dial range and other factors such as exemplified by the following:

GENERAL FORMULAS CONCERNING THE USE OF FINE WIRE FOR TRANSLATING MECHANICAL MOVEMENT INTO MAXIMUM PERIPHERAL DIAL READING TRAVEL.

THE FOLLOWING REPRESENTS RULES FOR DETERMINING (1) THE REQUIRED PINION DIAMETER, AND (2) THE WIRE DIAMETER:

$M$ = AVAILABLE MECHANICAL MOVEMENT IN INCHES AT RIGHT ANGLES TO THE LONGITUDINAL AXIS OF THE PINION.

$F$ = PINION DIAMETER REQUIRED FOR FULL CIRCLE TRAVEL.

$R$ = REQUIRED CIRCULAR READOUT FOR THE APPLICATION: (THE DECIMAL EQUIVALENT OF THE REQUIRED CIRCULAR READOUT IF A FULL CIRCLE (360°), IS CONSIDERED AS THE FACTOR (1).

$PD$ = REQUIRED PINION DIAMETER (INCHES).

$WF$ = THIS FACTOR IS RELATED DIRECTLY TO WIRE STRESS. DEPENDING ON FATIGUE OR CYCLE LIFE REQUIREMENTS, THIS VALUE MAY VARY FROM 15 to 100. FOR AVERAGE APPLICATIONS, A VALUE OF 45 IS FREQUENTLY USED.

$WD$ = MAXIMUM SINGLE STRAND WIRE DIAMETER.

$$\frac{M}{3.14} = F \qquad \frac{F}{R} = PD \qquad \frac{PD}{WF} = WD$$

For Example:

$$M = .150''$$
$$\frac{.150\ (M)}{3.14} = .047\ (F)$$
$$\frac{.047\ (F)}{.5\ (R)} = .094\ (PD)$$
$$\frac{.094\ (PD)}{45\ (WF)} = .00208''\ (WD)$$

Certain empirical factors such as (WF) used in the above discussion and formula, have been experimentally determined from use and experience.

Various changes may be made in the embodiment of the of the invention herein specifically described without departing from or sacrificing any of the advantages of the invention or any features thereof, and nothing herein shall be construed as limitations upon the invention, its concept or structural embodiment as to the whole or any part thereof except as defined in the appended claims. These formulae will assist in the ready determinations of the pinion shaft and tensioning wire diameters without any appreciable experimental attempts; however, it should be appreciated that unusual and special applications not now contemplated may require some measure of experimental studies, designs and efforts. These formulae are tendered to minimize experimental useages, designs and reasearch — not as an absolute avoidance thereof.

I claim:

1. A translation member for interposition between a mechanical movement and a measuring dial calibrated thereto, a pointer stub shaft journalled relative to said calibrated dial to rotarily support a pointer in confronting relation to said calibrated dial, a highly flexible small diameter wire of high tensile strength convoluted around said pointer stub shaft, and a substantially featherweight sling with outwardly sprung resilient arms to anchor the ends of said convoluted wire to convolutely tension the latter around said pointer stub shaft to render the pointer responsive to the operation of said translation member in all planar directions.

2. The combination defined in claim 1 wherein said outwardly sprung resilient sling arms have slits proximate to the free terminal ends thereof to enable wrapping the wire ends therearound for frictional retainer in said outwardly sprung sling arm slits and to convolutely tension said wire.

3. The combination defined in claim 2 having the sling adjustably mounted in the outward dial end region of the translation member.

4. The combination defined in claim 2 wherein a torque applying work engaging head displaces the translation member relative to said calibrated dial, and the sling is rotarily mounted for adjustment on said translation member proximate to said calibrated dial, said sling being operable in multiplanar directions without being substantially influenced by the urge of gravity.

5. The combination defined in claim 2 wherein a torque applying work engaging head displaces the translation member and the outwardly sprung resilient arms on said sling are rotatively mounted for adjustment correction on said translation member while maintaining the convoluted wire tensioned around the stub shaft.

6. The combination defined in claim 1 with said sling mounted in an end region of the translation member for convoluted tensioned connection by said wire with said pointer stub shaft, said sling rotarily mounted for adjustment relative to said translation member.

7. The combination defined in claim 1 wherein a torque applying work engaging head displaces the translation member relative to said, calibrated dial and the sling is adjustably mounted rotarily on said translation member proximate to said calibrated dial.

8. The combination defined in claim 1 wherein a torque applying work engaging head displaces the translation member and said sling is rotatively mounted for adjustment corrections on said translation member while maintaining said convoluted wire tensioned around said stub shaft.

9. A meter translation mount of substantially featherweight construction comprising a sling with confronting outwardly sprung arms, means on the arms of said sling to anchor the ends of a thin flexible tension transmitting wire thereon to maintain a convolution thereof tensioned in proper turning contact with a calibrated meter pointer stub shaft, and means for attaching the mount to a meter translation actuator which is responsive to a loaded work engaging member operable in all planar directions.

10. A meter translation mount definied in claim 9 wherein the mount attaching means consist of adjustable means to rotatively position said mount on the translation member in any predetermined position to adjust the response of the meter pointer stub shaft for correction of pointer readings to insure accuracy of operation.

* * * * *